April 7, 1970 J. A. HIBNER 3,505,662
READ PREAMPLIFIER WITH BYPASS CIRCUITRY
Filed Aug. 22, 1967
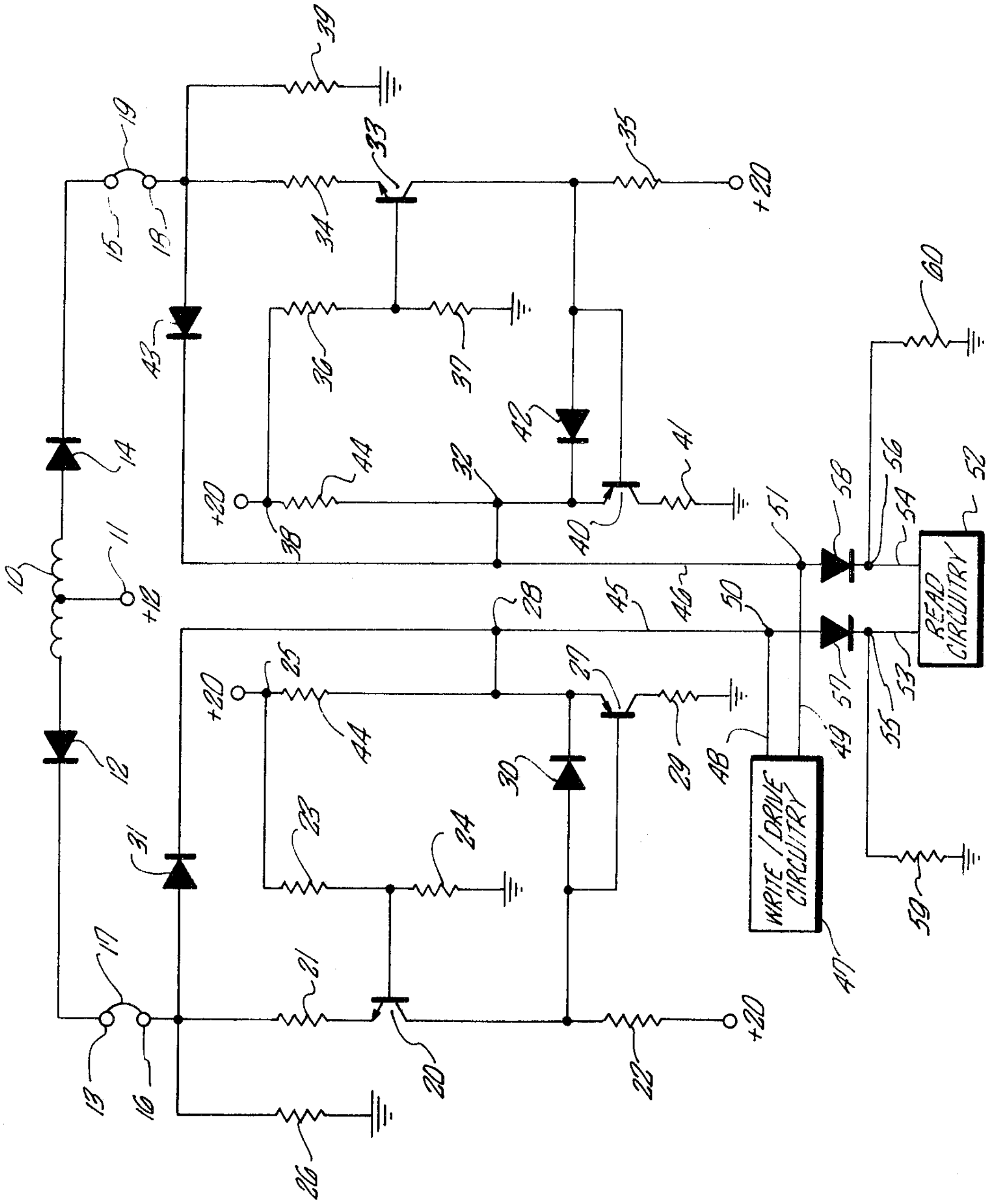
INVENTOR
JOHN A. HIBNER
BY Christie, Parker & Hale
ATTORNEYS.

United States Patent Office 3,505,662
Patented Apr. 7, 1970

3,505,662

READ PREAMPLIFIER WITH BYPASS CIRCUITRY

John A. Hibner, Sierra Madre, Calif., assignor to Burroughs Corporation, Detroit, Mich., a corporation of Michigan Filed Aug. 22, 1967, Ser. No. 662,327
Int. Cl. G11b *5/00*
U.S. Cl. 340—174.1 13 Claims

ABSTRACT OF THE DISCLOSURE

A preamplifier circuit having two symmetrical circuits respectively coupled between opposite ends of a read-write head and a single pair of transmission lines. The lines are normally terminated in their characteristic impedance and couple the head to "read" and "write" circuitry. Each symmetrical circuit has a linear amplifier stage coupled to the head and an isolation stage coupled to a respective one of the lines, with the isolation stage having an output impedance substantially matching the characteristic impedance of the line. Each symmetrical circuit also includes first and second bypass paths connecting the head and the isolation stage input, respectively, directly to the respective transmission line. Each path includes a normally back-biased diode which is forward-biased by the application of a "write" drive signal to its associated line.

BACKGROUND OF THE INVENTION

This invention relates to the magnetic recording of digital information and more particularly to an improved preamplifier of the push-pull type for amplifying signals induced in a read-write head during a "read" phase of operation and for isolating the head from the reactive load presented by transmission lines which connect the head to "read" amplifiers and "write" drivers.

In digital magnetic recording apparatus in which the same magnetic heads are utilized during both the "read" and the "write" phases of operation, such heads are normally connected to associated "read" and "write" circuitry by a twisted pair of transmission lines. Since each head is normally mounted in close proximity to the recording medium while the "read" and "write" circuitry is positioned a considerable distance away, the resultant distributed shunt capacitance presented by the pair of transmission lines will be quite large and may be as much as 150 to 300 picofarads. This large capacitance can be compensated for during the "write" phase of operation by means of a properly designed "write" drive circuit. During the "read" phase of operation, however, such distributed capacitance can impose a severe upper limitation upon bit rate frequency due to self-resonance. The severity of the problem is also increased during the "read" phase of operation by the resultant inductance presented by the head since this inductance can then be three to four times that presented during the "write" phase of operation. The transmission line is normally not terminated in its characteristic impedance since a terminated transmission line would impose a greater load upon the head during the "read" phase of operation.

One approach by which the head may be isolated from the "read" amplifiers utilizes an arrangement wherein isolation circuitry such as emitter-followers are inserted between the head and the "read" amplifiers. Each such emitter-follower is normally mounted as close to the head as possible and it in turn drives one line of a twisted pair of transmission lines which lead to the "read" amplifiers. Such an arrangement isolates the head output from the "read" amplifiers but in many memory organizations requires that the number of pairs of transmission lines be doubled over arrangements in which such isolation is not provided. This results since one pair of transmission lines is coupled between the isolation circuitry and the "read" amplifiers and another pair is coupled between the head and "write" drive circuitry. The additional transmission lines are needed since the relatively large signals transmitted between the head and "write" drive circuitry during the "write" phase of operation ordinarily exceed the handling capability of the isolation circuitry.

Another problem faced by digital magnetic recording apparatus is that radiation interference picked up on an unshielded twisted pair of transmission lines may produce an unsatisfactory signal-to-noise ratio during the "read" phases of operation when unamplified signals from the head are presented to the pair of transmission lines.

An advantage of the present invention is that it provides a circuit intermediate the head and a single twisted pair of transmission lines which permits the single pair to be utilized during both the "read" and "write" phases of operation and permits each line to be terminated in its characteristic impedance.

Another advantage of the present invention is that it provides a circuit intermediate the head and a single twisted pair of transmission lines which isolates the pair of transmission lines and the head during the "read" phase of operation.

Another advantage of the present invention is that it provides an improved preamplifier circuit intermediate the head and a single pair of transmission lines.

A further advantage of the present invention is that it provides an improved balanced preamplifier circuit intermediate a read-write head and "read" and "write" circuitry which enables a single pair of unshielded transmission lines terminated in their characteristic impedance to transmit signals between the head and both the "read" and "write" circuitry.

Yet another advantage of the present invention is that it presents an improved balanced preamplifier circuit intermediate a read-write head and a single pair of transmission lines terminated in their characteristic impedance which provides impedance matching both for the head and for the pair of transmission lines.

Still another advantage of the present invention is that it provides an improved balanced preamplifier circuit which is less expensive to produce and operate than prior art circuitry.

SUMMARY OF THE INVENTION

In brief, the preceding and additional advantages are achieved in a preamplifier circuit having an amplification stage and an isolation stage operative to couple a read-write head to a pair of transmission lines during the "read" phase of operation and a bypass path, operative during the "write" phase of operation, for coupling the head directly to the lines during the "write" phase, A constant voltage source is connected to a center tap of the head while a common base transistor amplifier of a first symmetrical circuit is connected to one side of the head and a common base transistor amplifier of a second symmetrical circuit is connected to the other side of the head. The outputs of the amplifiers are respectively presented to two emitter-follower circuits in respective ones of the symmetrical circuits. The two emitter-followers drive respective ones of a pair of transmission lines which, during the "read" phase of operation, are terminated in their characteristic impedance. A first bypass path in each symmetrical circuit connects one end of the head directly to a respective one of the transmission lines. This path includes a diode which is back-biased during the "read" phase of operation, but which becomes forward-biased during the "write" phase thereby bypassing the amplifier and emitter-follower during the "write" phase. Disconnect diodes also serve to remove the characteristic impedance termination from the transmission lines during the "write" phase of operation. Additionally, a protective diode which becomes forward-biased only during the "write" phase of operation enables current to flow in a second bypass path which prevents breakdown of the emitter-follower as a result of an excessive back-bias voltage.

BRIEF DESCRIPTION OF THE DRAWING

The manner of operation of the present invention and the manner in which it achieves the above and other advantages may be more clearly understood by reference to the following detailed description when considered with the drawing, the single figure of which depicts a schematic circuit diagram of a preferred embodiment of a preamplifier circuit according to the present invention.

DETAILED DESCRIPTION

In the drawings, read-write head 10 has a center tap 11 which is held at a potential of +12 volts. Diode 12 connects one end of head 10 to terminal 13, and diode 14 connects the other end of head 10 to terminal 15. Terminal 13 is connected to terminal 16 by means of line 17, and terminal 15 is connected by terminal 18 by means of line 19. Although lines 17 and 19 are shown herein for purposes of illustration as being exemplary leads connecting together a pair of terminals, that may advantageously comprise selection circuitry by means of which a predetermined one of a number of read-write heads may selectively be connected to a pair of symmetrical circuits in accordance with the present invention.

Two identical circuits are connected to opposite ends of read-write head 10 by means of leads 17 and 19 respectively. With respect to one of these two circuits, a linear amplifier including NPN transistor 20 is connected to terminal 16. Resistor 21 is connected between the emitter terminal of transistor 20 and terminal 16, and resistor 22 is connected between the collector terminal of transistor 20 and a potential source which is maintained at +20 volts. The base element of transistor 20 is connected to the junction of resistors 23 and 24 which are connected between a terminal 25 which is maintained at a potential of +20 volts and ground reference potential, respectively. Resistor 26 is connected between terminal 16 and ground reference potential.

An emitter-follower circuit, including PNP transistor 27, is connected between the collector terminal of transistor 20 and terminal 28. The base element of transistor 27 is connected to the collector element of transistor 20, and the emitter element of transistor 27 is connected to terminal 28. Resistor 29 is connected between the collector element of transistor 27 and ground reference potential. Resistor 44 is connected between the emitter element of transistor 27 and terminal 25.

Diode 30 is connected between the collector element of transistor 20 and the emitter element of transistor 27. A diode 31 is connected between terminal 16 and terminal 38.

Another circuit identical to that just described is connected between terminal 18 and terminal 32. Thus a linear amplifier, including NPN transistor 33, is connected to terminal 18. Resistor 34 is connected between the emitter element of transistor 33 and terminal 18, and resistor 35 is connected between the collector element of transistor 33 and a source of potential which is maintained at +20 volts. The base element of transistor 33 is connected to the junction of resistors 36 and 37 which are connected between a terminal 38 which is maintained at a potential of +20 volts and ground reference potential, respectively. Resistor 39 is connected between terminal 18 and ground reference potential.

An emitter-follower circuit, including transistor 40, is connected between the collector element of transistor 33 and terminal 32. The base element of transistor 40 is connected to the collector element of transistor 33. Resistor 41 is connected between the collector element of transistor 40 and ground reference potential. Resistor 43 is connected between the emitter element of transistor 40 and terminal 38.

A diode 42 is connected between the collector element of transistor 33 and the emitter element of transistor 40, which in turn is connected to terminal 32. A diode 43 is connected between terminal 18 and terminal 32.

Terminals 28 and 32 are respectively connected to transmission lines 45 and 46. Lines 45 and 46 are, for illustrative purposes, shown as being relatively short with respect to the remaining circuitry shown in the drawing and also are shown as being parallel to each other. In actuality, however, these lines will be relatively long and advantageously may comprise a single twisted pair of transmission lines. The lines 45 and 46 are connected at their opposite ends to "write" drive circuitry 47 by leads 48 and 49 which are connected to terminals 50 and 51, respectively, and are also connected at their opposite ends to "read" circuitry 52 by leads 53 and 54 which are connected to terminals 55 and 56, respectively. The portion of line 45 between terminals 50 and 55 includes diode 57, and the portion of line 46 between terminals 51 and 56 includes diode 58. Impedances 59 and 60 are connected between terminals 55 and 56, respectively, and ground reference potential.

"Write" drive circuitry 47 is shown in block diagram form and may comprise any well-known "write" drive circuitry capable of effecting a relatively large "write" drive signal on a predetermined one of the lines 45 and 46 during the "write" phase of operation. Advantageously, saturation of a transistor within circuit 47 will cause that one of the transmission lines 45 and 46 on which a "write" drive signal is effected, to assume a value of potential approximately equal to ground reference potential. "Read" circuitry 52 is also shown in block diagram form, and may comprise any well-known "read" circuitry including "read" amplifiers for amplifying signals presented on lines 45 and 46 during the "read" phase of operation.

Impedances 59 and 60 are of a value such that together with "read" circuit 52, they present a termination impedance on each of the lines 45 and 46 equal to the characteristic impedance of these lines. The characteristic impedance may, for example, be approximately 110 ohms. Thus, during the "read" phase of operation, both lines 45 and 46 will be terminated in their characteristic impedance. This termination impedance is removed from the lines during the "write" phase of operation by means of disconnect diodes 57 and 58. These diodes are poled such that they are forward-biased during the "read" phase of operation, but become back-biased during the "write" phase of operation when the line on which a "write" drive signal is effected is reduced to ground potential.

The operation of the embodiment of the present invention shown in the drawing will now be discussed, and attention is directed to the first mentioned symmetrical circuit. During the "read" phase of operation, an output signal from head 10 appearing at terminal 16 is amplified by means of the common base linear amplifier which includes transistor 20. Resistor 26 is chosen to provide a forward current of approximately 5 milliamperes through diode 12 in order that this diode may provide a relatively low impedance. Resistor 26 also provides emitter current for transistor 20. Resistor 26 and the linear amplifier together provide an input impedance which approximates the value of output impedance provided by head 10 in order to maximize the "read" signal. This value of impedance may, for example, be approximately 250 ohms.

Resistors 23 and 24 operate as a voltage divider to set the DC operating conditions for transistor 20. Resistors 23 and 24 are chosen so as to have a current of approximately 10 milliamperes therein. This value of current is at least an order of magnitude greater than the base current flowing within transistor 20 during the "read" phase of operation and assures that the potential assumed by the base element of transistor 20 will not change appreciably with change of base current during the "read" phase of operation. The base of transistor 20 will be at approximately 13 volts during the "read" phase of operation, while the collector of transistor 20 will be at approximately 14 volts. An amplified "read" signal appears at the collector of transistor 20 during the "read" phase of operation and the gain provided by this amplifier will normally be from five to ten. This amplified "read" signal ratio with respect to noise created by radiation interference picked up on transmission line 45.

Resistor 21 reduces the effect of large differences in the beta characteristic of actual transistors utilized for transistor 20. Resistor 21 reduces the effect caused by these variations in beta characteristic in the production tolerances of commercially available transistors, and provides greater interchangeability with respect to the transistors used for transistor 20 of the drawing.

The amplified "read" signal is next presented to the base of transistor 27. This transistor is connected to provide an emitter-follower which operates as a power amplifier to provide an impedance transformation from a high source impedance to a low load impedance. The emitter-follower configuration is selected to provide a low output impedance which substantially matches the characteristic impedance of line 45. The use of an emitter-follower isolates the transmission line from the read-write head and thus prevents the low impedance line from presenting a heavy load to the read-write head. Additionally, the emitter-follower enables the transmission line 45 to be terminated in its characteristic impedance, thus removing from the circuit the load of the shunt capacitance and series inductance of the line. During the "read" phase of operation, the emitter of transistor 27 assumes a potential of approximately 14.5 volts. Resistor 29 is a protective resistor which limits the power dissipated within transistor 27 to a value within the ratings for this transistor and permits the collector of transistor 27 to approach more closely the value of potential assumed by the emitter of transistor 27 thereby reducing the total power dissipated in transistor 27.

Diode 31 provides a bypass of the linear amplifier and emitter-follower during the "write" phase of operation. During the "write" phase of operation, if the "write" drive circuitry effects a "write" drive signal on line 45, this line will be rapidly pulled to ground potential. When line 45 is thus pulled to ground potential, diode 31 becomes forward-biased and, as a result, the "write" drive signal bypasses all of the "read" preamplifier circuitry and passes directly from terminal 16 to terminal 28 via diode 31. When line 45 is thus rapidly pulled to ground potential, diode 30 also becomes forward-biased, thereby providing a path which bypasses the base-to-emitter junction of transistor 27. Diode 30 is a protective diode which prevents an excessive back-bias voltage from being presented between the base and emitter elements of transistor 27. When line 45 is pulled to ground, there might be as much as 14 volts of back-bias presented on the base-to-emitter junction of transistor 27 if diode 30 were not present. Such a value is greatly in excess of the normal breakdown rating of transistor 27 which, for example, may be approximately 5 volts.

Transistor 20 is also back-biased during the "write" phase of operation and this back-biasing may turn on the collector-to-base junction of this transistor causing it to function as a conducting diode. This is unimportant, however, so far as the operation of the circuit is concerned and no damage is done to transistor 20 since resistor 23 acts, at this time, as a current limiting resistance.

The operation of the other symmetrical circuit which joins head 10 to transmission line 46 is identical to that of the circuit just described and will not be discussed herein.

Table I, infra, sets forth representative values of resistors depicted in the circuit shown in the drawing. The transistors in the drawing are advantageously of the high-frequency, silicon, 300 milliwatt type; while the diodes are advantageously of the silicon, high-speed switching type. It will be apparent to those skilled in the art that the following values may be modified without departing from the scope of applicant's teaching.

TABLE I

R21 and R34—61.9 ohms
R23 and R36—3.83K ohms
R24 and R37—6.19K ohms
R44 and R43—470 ohms (2 watt)
R22 and R35—1.21K ohms
R29 and R41—21.5 ohms
R26 and R39—1.47K ohms What has been described is considered to be only an illustrative embodiment of the present invention and accordingly it is thereby understood that various and numerous other arrangements may be devised by one skilled in the art without departing from the spirit and scope of this invention.

What is claimed is:

1. In a digital magnetic recording system, preamplifier circuitry coupling a read-write head to "read" and "write" circuits comprising:

a pair of symmetrical circuits coupled to opposite ends of the head; and a single pair of transmission lines associated with the head, each line being terminated in its characteristic impedance;

each of the symmetrical circuits being coupled to a respective one of the transmission lines;

each of the symmetrical circuits comprising:

a first amplifier stage coupled to the head;

a second amplifier stage coupled between the first stage and the respective one of the transmission lines;

the second amplifier having an output impedance substantially smaller than its input impedance; and a bypass path connected between the head and the respective one of the transmission lines and including a normally back-biased diode, the diode being forward-biased by the application of a "write" drive signal to its associated transmission line.

2. In a digital magnetic recording system, preamplifier circuitry according to claim 1 in which the first amplifier stage comprises a common base transistor amplifier.

3. In a digital magnetic recording system, preamplifier circuitry according to claim 2 in which the second amplifier stage comprises an emitter-follower transistor amplifier.

4. In a digital magnetic recording system, preamplifier circuitry according to claim 3 further comprising a normally forward-biased disconnect diode connected between each transmission line and its termination impedance, the diode being back-biased by the application of a "write" drive signal to its associated transmission line.

5. In a digital magnetic recording system, preamplifier circuitry according to claim 4 further comprising a bypass path in each symmetrical circuit connected between its first amplifier stage and its associated transmission line and including a normally back-biased diode, the diode being forward-biased by the application of a "write" drive signal to its associated transmission line.

6. In a digital magnetic recording system, preamplifier circuitry according to claim 1 in which the output impedance of the second amplifier stage substantially matches the characteristic impedance of its associated transmission line.

7. In a digital magnetic recording system, preamplifier circuitry according to claim 6 in which the input impedance of each symmetrical circuit substantially matches the output impedance presented to it by the head.

8. In a digital magnetic recording system, preamplifier circuitry coupling a read-write head to "read" and "write" circuits comprising:

a linear transistor amplifier coupled to the head;

an emitter-follower circuit coupled between the amplifier and one end of a transmission line;

the other end of the transmission line being coupled to the "read" circuitry and "write" circuitry and being terminated in its characteristic impedance;

the emitter-follower circuit having an output impedance substantially matching the characteristic impedance of the transmission line; and a bypass path connected between the head and the one end of the transmission line and including a normally back-biased diode, the diode being forward-biased by the application of a "write" drive signal from the "write" circuitry to the transmission line.

9. In a digital magnetic recording system, a preamplifier circuit according to claim 8 further comprising a bypass path connected between the output of the linear transistor amplifier and the one end of the transmission line and including a normally back-biased diode, the diode being forward-biased by the application of a "write" drive signal from the "write" drive circuitry to the transmission line.

10. In a digital magnetic recording system, a preamplifier circuit according to claim 9 in which the linear transistor amplifier comprises a common base transistor amplifier the base element of which is connected to the junction of two voltage divider resistors the opposite ends of which are respectively maintained at first and second values of potential.

11. In a digital magnetic recording system, a preamplifier circuit according to claim 10 further comprising a resistor connected between a reference potential and the input of the transistor amplifier, the resistor and amplifier together presenting an input impedance which substantially matches the output impedance of the head.

12. In a digital magnetic recording system, a preamplifier circuit according to claim 11 further comprising a normally forward-biased disconnect diode connected between the transmission line and its termination impedance, the diode being back-biased by the application of a "write" drive signal from the "write" drive circuitry to the transmission line.

13. In a digital magnetic recording system, a preamplifier circuit coupling a read-write head to "read" and "write" circuitry comprising:

a pair of symmetrical circuits coupled to opposite sides of the head; and a single pair of transmission lines associated with the head, each line being terminated in its characteristic impedance;

each of the symmetrical circuits being coupled to a respective one of the transmission lines;

each of the symmetrical circuits comprising:

a linear transistor amplifier coupled to the head;

an emitter-follower circuit coupled between the amplifier and one end of the respective one of the transmission lines;

the emitter-follower circuit having an output impedance substantially matching the characteristic impedance of its respective transmission line;

a first bypass path connected between the head and the one end of the respective transmission line and including a normally back-biased diode, the diode being forward-biased by the application of a "write" drive signal from the "write" circuitry to the respective transmission line; and a second bypass path connected between the output of the linear transistor amplifier and the one end of the respective transmission line and including a normally back-biased diode, the diode being forward-biased by the application of a "write" drive signal from the "write" circuitry to the respective transmission line.

References Cited

UNITED STATES PATENTS

| | | | |
|---|---|---|---|
| 3,173,134 | 3/1965 | Petermann | 340—174.1 |
| 3,261,004 | 7/1966 | Cochran et al. | 340—174.1 |

BERNARD KONICK, Primary Examiner

WILLIAM F. WHITE, Assistant Examiner

U.S. Cl. X.R.

346—74; 330—51, 144, 151

PO-1050
(5/69)

UNITED STATES PATENT OFFICE

CERTIFICATE OF CORRECTION

Patent No. 3,505,662 Dated April 7, 1970

Inventor(s) John A. Hibner

It is certified that error appears in the above-identified patent and that said Letters Patent are hereby corrected as shown below:

Column 5, Line 12, after the word "signal" please add the following words which were omitted:

--thus substantially improves the overall signal-to-noise--

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents